United States Patent Office 2,909,170
Patented Oct. 20, 1959

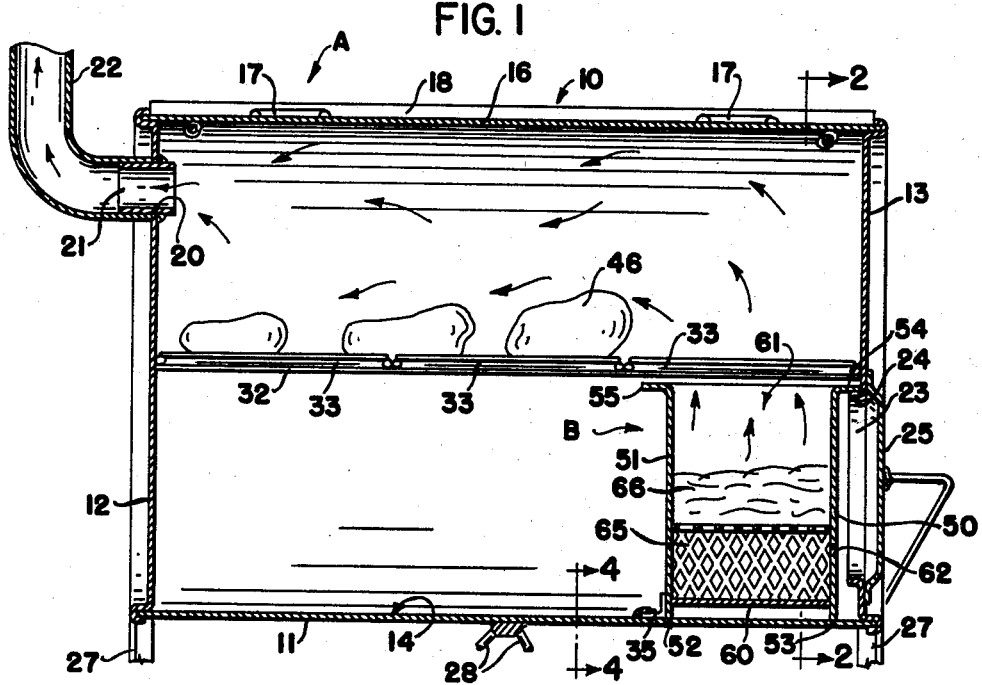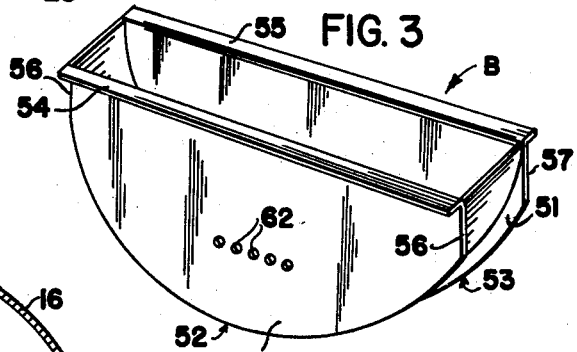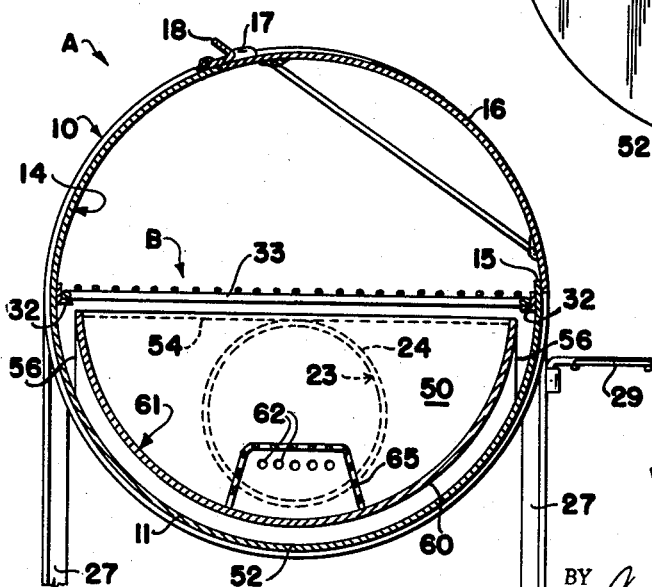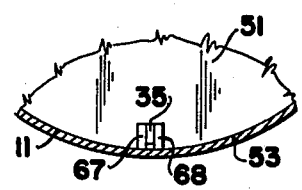

2,909,170

BARBECUE APPARATUS

William R. Hathorn, Jr., Alexandria, La.

Application November 6, 1957, Serial No. 694,845

2 Claims. (Cl. 126—25)

This invention relates to improvements in barbecue apparatus, and more particularly to improvements in the provision of removable fire boxes for use in equipment of the general character variously designated as barbecue pits, ranges, ovens, etc., used for the roasting, broiling, smoke-curing, etc., of foods, such as flesh, fish and vegetables.

The primary object of this invention is the provision of a removable fire box adapted to fit within a portable barbecue pit of the general character shown in my copending application, Serial No. 497,601, filed March 29, 1955.

A further object is the provision of a fire box for installation in barbecue pits and the like wherein an appreciable quantity of the air being pulled into the barbecue pit by natural draft will pass directly through the burning fuel within the fire box, thus assuring that most of the air passing over the food will be heated, and lessening the possibility of a portion of the air reaching the meat without being preheated, with resultant cooling of the food.

A further object is the provision of a removable fire box for barbecue pits and the like wherein the burning fuel is supported in a spaced relation to the exterior walls of the barbecue pit, so that the burning fuel within the fire box will not tend to discolor the exterior surface of the barbecue pit and the barbecue pit will remain attractive for a long period of time.

A further object is the provision of a removable fire box for barbecue pits and the like, providing for the facile removal of the ashes and other residues from the barbecue pit.

Other objects and advantages of this invention will be apparent from the following detailed description of a highly successful embodiment of my invention, taken in connection with the accompanying drawing, forming a part of this specification and in which drawing:

Fig. 1 is a vertical sectional view longitudinally through a barbecue pit showing the mounting therein of my improved removable fire box.

Fig. 2 is a transverse sectional view taken substantially on the line 2—2 of Fig. 1.

Fig. 3 is a perspective view of my improved fire box.

Fig. 4 is a fragmentary view taken substantially on the line 4—4 of Fig. 1.

In the drawing, wherein for the purpose of illustration is shown a preferred form of the invention, and wherein similar reference characters designate corresponding parts throughout the several views, A designates a barbecue pit and B a fire box adapted to be placed within the barbecue pit A.

The barbecue pit A generally comprises a housing 10, which includes an elongated cylindrical body portion 11 and end walls 12 and 13, defining a chamber 14 within the housing 10. The housing 10 is provided with an opening 15 extending substantially the entire length of the housing 10, so that access may be easily had to the entire length of the barbecue pit. A lid or door 16, covering the opening 15 is hingedly supported upon the housing 10 by hinges 17, there being an abutment 18 mounted upon the housing 10 to limit the opening of the lid or door 16 so that the same will not be opened to such an extent as to force the hinges 17 out of proper alignment.

Provided at the uppermost portion of the end wall 12 is a vent opening 20, which receives a sleeve 21 therethrough for attachment of a smoke stack 22. This provides for an air egress opening leading from the uppermost portion of the chamber 14 of the housing 10 at end wall 12.

The lowermost portion of the end wall 13 is provided with an opening 23 defined by the inward turned flange portion 24 of the end wall 13. A hinged door structure 25 is provided covering the opening 23. While the apparatus is in use the door 25 is left slightly ajar, permitting ingress of air into the chamber 14 of the housing 10.

Suitable standards 27 and braces 28 may be provided at the lowermost portion of the housing 10 for the support of the barbecue pit A. There may also be supported upon the housing 10, adjacent the opening 15, a suitable table portion 29, which may be utilized in preparing food prior to the insertion within the barbecue pit A.

Disposed in a substantially horizontal plane, centrally of the chamber 14, and secured in opposed relation to the innermost surface of the elongated cylindrical body portion 11 are longitudinal L-shaped flanges 32. One each of these flanges 32 is provided on either side of the chamber 14, as shown in Fig. 2, for the support of grills 33. The grills 33 preferably comprise three separate grill structures removably mounted upon the flanges 32. Separate grill structures are provided so that the grill directly over the fire box B can be removed, to replenish the fuel supply within the fire box without removing the other two grills, permitting food to remain on the other grills as the fuel supply is replenished.

An L-shaped bracket 35 is welded or otherwise secured to the body portion 11, within the chamber 14 and spaced from the end wall 13, for holding the fire box in a fixed position, as will be subsequently described.

Thus a barbecue pit is provided wherein a fire may be spread entirely across the lowermost portion of the elongated cylindrical body portion 11, for cooking a vast quantity of meats supported upon the grills 33; or, a small quantity of food may be cooked upon the grill 33 directly above the fire box B; or, as illustrated in the drawings, a fire may be built within the fire box B and food 46 supported on the grills 33, not directly above the fire box B, for the smoking of the food 46 without the direct application of heat to the food 46.

The fire box B generally comprises a pair of side plates 50 and 51, having arcuate lowermost edges 52 and 53 of the same radius as the interior of the housing 11. The uppermost portions of the side edges 50 and 51 are turned outwardly forming flanges 54 and 55. The side edges of the side plates 50 and 51 terminate in vertical portions 56 and 57, so that the side plates 50 and 51 will fit between the L-shaped plates 32, when inserted within the barbecue pit A.

Secured between the side plates 50 and 51 is a fuel receiving plate 60 defining a chamber 61. The fuel receiving plate 60 is arcuately disposed between the side plates 50 and 51, the arc thereof being of a substantially smaller radius than the lowermost edges 52 and 53 of the side plates 50 and 51, so that the lowermost surface of the fuel receiving plate 60 is curvilinearly spaced from the lowermost edges 52 and 53 of the side plates 50 and 51. Vent openings 62 may be provided adjacent the lowermost portion of the side plate 50, permitting the ingress of air into the chamber 61. A removable grate 65 may be mounted within the chamber 64, the uppermost portion of the grate 65 being disposed above the vent openings 62. This provides for the supporting of the fuel 66 above the vent openings 62 and provides an air space for the draft passage of air through fuel 66.

Secured to the lowermost portion of the side 51, adjacent the arcuate side edge 53, are a pair of spaced plates 67 and 68. These plates are spaced to receive the upstanding portion of the L-shaped bracket 35 therebetween, forming fire box positioning means assuring proper placement of the fire box B within the chamber A.

The fire box B is designed to be supported within the chamber 14 with the side edges 52 and 53 thereof resting upon the body portion 11, with the flange 54 of the side plate 50 resting upon the inturned flange 24 of the side wall 13, and is securely held in place by the L-shaped bracket 35 which is fitted between the plates 67 and 68. Thus the fire box B is held in a secure position within the chamber 14, without likelihood of either lateral or transverse displacement.

It will thus be seen from Figs. 1 and 2 that the fuel receiving plate 60 of the fire box B is supported within the barbecue pit A so that the lowermost surface thereof is above the elongated longitudinal body portion 11, completely out of contact with the housing 10 so that heat of any fire, which may be built within the fire box B, will not be directly conducted to the housing 10 of the barbecue pit A and the likelihood of discoloration of the housing 10 due to the heat of the fire will be substantially eliminated.

It will also be noted that the fire box B is so disposed within the chamber 14 that air will be forced to pass either directly through the vent openings 62 of the fire box and thence through the fuel 66, or follow a circuitous path about the fire box itself so that a negligible amount of air will find its way around the fire box without being heated.

Ash removal with the utilization of this fire box B is relatively simple as the entire box may be easily removed from within the barbecue pit A and the ashes emptied therefrom into a suitable container.

While I have disclosed the fire box B as preferably disposed within only a small portion of the chamber 14 of the barbecue pit A, it is to be understood that, with various slight modifications, the fire box B may be disposed for the entire length of the barbecue pit A.

Various changes may be made to the form of invention herein shown and described without departing from the spirit of the invention or the scope of the following claims.

I claim:

1. In equipment for food barbecuing, smoke curing, broiling and the like, the combination of a housing having end walls and defining a chamber therein, said chamber including a fuel receiving portion and a food receiving portion; a fire box disposed within said fuel receiving portion, said fire box being substantially of the same transverse width as said fuel receiving portion and being of a substantially smaller longitudinal length than said fuel receiving portion so that said fire box extends longitudinally for only a short length of said food receiving portion, said fire box including a pair of side plates extending longitudinally substantially the transverse width of said chamber and extending vertically substantially the height of said fuel receiving portion, each of said side plates having outwardly extending flanges at their uppermost ends, and an imperforate fuel receiving plate supported between said side plates, said side plates and said fuel receiving plate defining a fuel receiving cavity with said fuel receiving plate being spaced inwardly from the outermost edges of said side plates for receiving fuel thereupon in a spaced relationship from said housing and said flanges extending outwardly from said cavity, the outwardly extending flange of one of said side plates being adapted to abut against one end wall of said housing and to space said fire box therefrom; and positioning means including a bracket mounted on said housing abutting said side plate opposite said last mentioned side plate and holding said last mentioned outwardly extending flange in abutment with said wall, thereby positioning said fire box to one end of said fuel receiving portion with the fuel receiving cavity of said fire box spaced from said housing.

2. The combination as specified in claim 1 wherein said positioning means comprises a pair of spaced plates secured to said side plate opposite said last mentioned side plate, said bracket slidably interfitting between said spaced plates and abutting said side plate, the coaction between said bracket and said side plate preventing longitudinal movement of said fire box within said fuel receiving portion, and the coaction between said bracket and said spaced plates preventing transverse movement of said fire box within said fuel receiving portion.

References Cited in the file of this patent

UNITED STATES PATENTS

| | | |
|---|---|---|
| 151,508 | Peckover | June 2, 1874 |
| 229,684 | Egan | July 6, 1880 |
| 238,870 | Egan | Mar. 15, 1881 |
| 293,973 | Mattice | Feb. 19, 1884 |
| 698,798 | Cahoone | Apr. 29, 1902 |
| 1,397,386 | Roessler | Nov. 15, 1921 |
| 2,101,180 | Jacobs | Dec. 7, 1937 |
| 2,349,617 | Gorman | May 23, 1944 |
| 2,403,134 | Stephenson | July 2, 1946 |
| 2,568,022 | Parker | Sept. 18, 1951 |
| 2,626,559 | Rau | Jan. 27, 1953 |
| 2,666,426 | Pollard | Jan. 19, 1954 |
| 2,786,463 | Vincent | Mar. 26, 1957 |
| 2,792,773 | Barker | May 21, 1957 |